United States Patent [19]

Borsuk

[11] 4,255,016
[45] Mar. 10, 1981

[54] FIBER OPTIC CONNECTOR

[75] Inventor: Leslie M. Borsuk, Los Alamitos, Calif.

[73] Assignee: International Telephone and Telegraph Corporation, New York, N.Y.

[21] Appl. No.: 53,711

[22] Filed: Jul. 2, 1979

[51] Int. Cl.³ .................................................. G02B 5/14
[52] U.S. Cl. .................................................. 350/96.21
[58] Field of Search ............... 350/96.20, 96.21, 96.22, 350/96.15

[56] References Cited
U.S. PATENT DOCUMENTS

| | | | |
|---|---|---|---|
| 3,455,625 | 7/1969 | Brumley et al. | 350/96.22 |
| 3,963,323 | 6/1976 | Arnold | 350/96.22 |
| 3,984,174 | 10/1976 | Landgreen | 350/96.22 |

*Primary Examiner*—Stewart J. Levy
*Attorney, Agent, or Firm*—Thomas L. Peterson

[57] ABSTRACT

A fiber optic connector is disclosed in which a ring having a thin film stretched over its face is mounted in the connector between the mating faces of the optical fibers being coupled. Because of the thinness of the film, the film may have an index of refraction similar to, but not necessarily matching, that of the fibers. The ring may be removed from the connector to allow replacement of the film thereon.

12 Claims, 7 Drawing Figures

FIBER OPTIC CONNECTOR

BACKGROUND OF THE INVENTION

The present invention relates generally to a fiber optic connector and, more particularly, to a fiber optic connector employing a substantially matching index of refraction material between the mating faces of the optical fibers in the connector.

The present invention will be described specifically in connection with a single fiber optical fiber connector, although it will be appreciated that the invention could also be applicable to fiber bundle connectors. Regardless of the fiber alignment mechanism utilized in a single fiber demountable connector, an optical loss will occur at the interface of the opposing fibers. This loss is due to the reflections at the end faces of the fibers and is a function of the index of refraction differences of the fiber cores and the air between the two fibers. This loss is commonly known as the Fresnel loss and is theoretically equivalent to 0.32 dB.

In order to eliminate the Fresnel loss, it is known in the art that an index of refraction matched material may be introduced between the mating faces of the optical fibers in the connector. U.S. Pat. No. 3,455,625 to Brumley discloses that such material may be liquid or grease-like. It is commonly believed in the industry that there are serious disadvantages to the use of liquid materials, one of which is the inability to perform repeated matings and dematings of the connector parts without loss of the liquid. Brumley also teaches the use of a solid silicone elastomer disc between the mating faces of optical fibers. Such disc, however, is relatively thick and, therefore, causes optical power losses. U.S. Pat. No. 3,984,174 to Landgreen teaches the use of a clear silicone rubber coating over the end of a fiber optic bundle terminal. Landgreen discloses that the thickness of the coating is about 0.002 inch. With two mating terminals provided with such coatings, a 0.004 inch gap will occur between the end faces of the fiber bundles in the terminals which still results in a minor loss of optical transmission through the connector.

It is the object of the present invention to provide a very thin, but solid, substantially indexed matching element between the mating faces of optical fibers in a connector which causes less optical power losses than the solid indexed matched elements of the prior art, yet without the risk of loss of the material upon repeated matings and dematings of the connector halves.

SUMMARY OF THE INVENTION

According to the principal aspect of the present invention, there is provided a fiber optic connector comprising a support body having a passage therethrough, adapted to receive a pair of mating optical fibers in its opposite ends. A ring is provided having a solid film extending across it and secured thereto. The film has an index of refraction similar to, but not necessarily matching, that of the fibers. Supporting means supports the ring in the passage in a plane extending normal to the longitudinal axis of the passage.

The film may be in the form of a very thin sheet of plastic stretched over the ring to provide a wrinkle-free film between the end faces of the optical fibers mounted in the connector. Because the film is mounted on a ring, the ring may be removed to allow substitution of a new ring provided with a film, or replacement of the film on the original ring. Since the film is very thin, optical losses are minimized, yet the film is not lost during repeated matings and dematings of the connector halves as is an indexed matching liquid.

DESCRIPTION OF THE PREFERRED EMBODIMENTS

Figure 1:
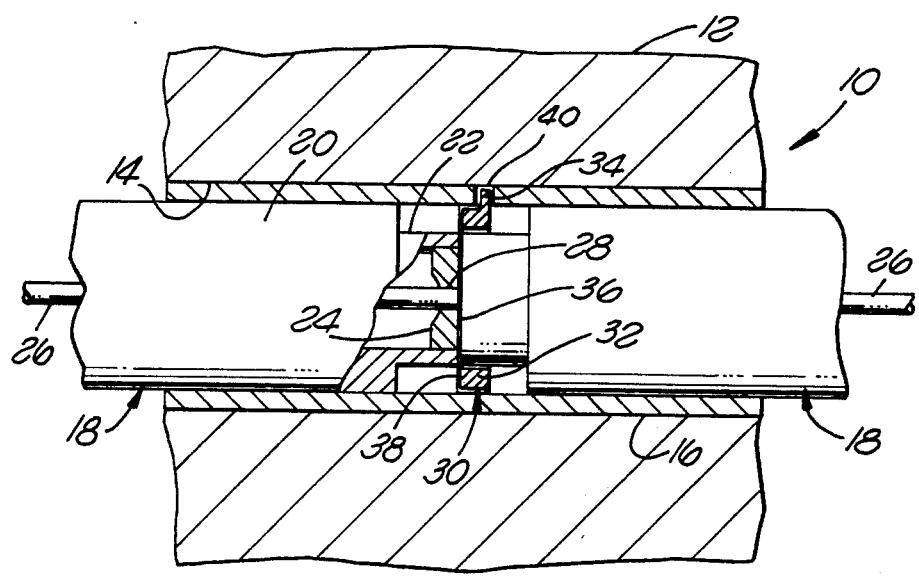
FIG. 1 is a fragmentary, partial longitudinal sectional view through the fiber optic connector of the present invention employing a ring having a substantially indexed matching film thereon.
Figure 2:
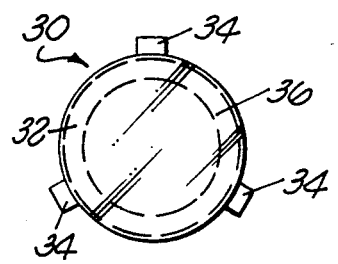
FIG. 2 is an elevational view of the ring illustrated in FIG. 1.
Figure 3:
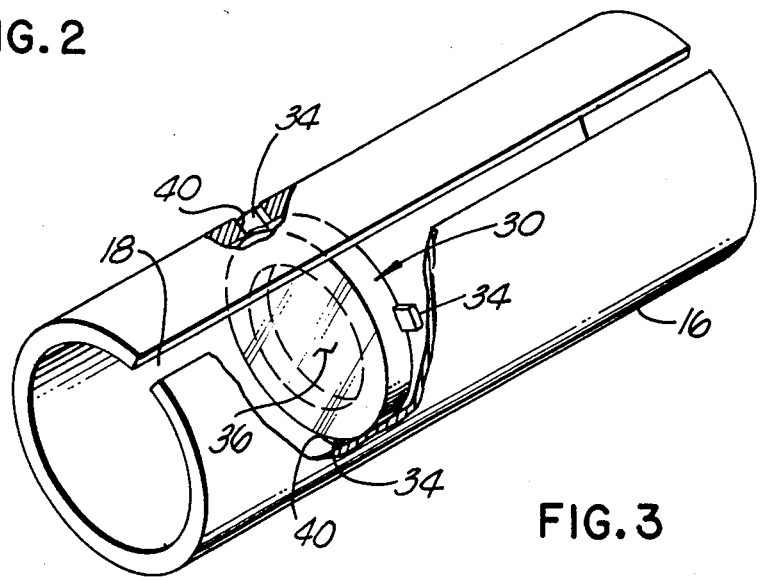
FIG. 3 is a perspective view of the guide sleeve utilized in the connector illustrated in FIG. 1 in which the ring is mounted, with a portion of the wall of the sleeve removed to show the interior thereof.

Referring now to FIGS. 1 to 3 of the drawings in detail, there is illustrated one embodiment of the fiber optic connector of the present invention, generally designated 10. The connector comprises a support body 12 having a cylindrical passage 14 extending therethrough. A cylindrical guide sleeve 16 is mounted in the passage 14. A pair of fiber optic ferrules 18 are mounted in the opposite ends of the sleeve. Each ferrule comprises a cylindrical body 20 having a forward cylindrical extension 22 of a diameter less than that of the body. A pierced watch-bearing jewel 24 is mounted in the front of extension 22. The forward end of an optical fiber 26 in the ferrule is mounted within the center opening 28 in the jewel to accurately position the fiber axially within the ferrule. The guide sleeve 16 is precisely dimensioned to receive the ferrules 18 in a close sliding fit to assure alignment of the fibers 26 in the respective ferrules.

A ring assembly, generally designated 30, is mounted in the guide sleeve 16 between the mating ferrules 18. The assembly 30 comprises a ring 32 having three outwardly extending equally spaced tabs 34 thereon and a thin film or sheet 36 extending over the front face 38 of the ring. A suitable film which may be utilized in the practice of the present invention is Mylar polyethylene terephthalate, an oriented polyester. This material is available in thicknesses which are substantially thinner than the indexed matching solid materials which have been utilized in the prior art fiber optic connectors. The plastic film may be stretched across the face 38 of the ring 32 and secured at its outer periphery of the ring by irradiating the film to cause it to shrink fit about the circumference of the ring.

As best seen in FIG. 3, the guide sleeve 16 is longitudinally slit to provide an open slot 18 when the sleeve is in its relaxed condition outside of the passage 14 in support body 12. Three rectangular openings 40 are formed in the sleeve 16 circumferentially spaced there-about a distance corresponding to the spacing of the tabs 34 on ring 32. The guide sleeve 16 has a diameter selected such that when the sleeve is radially compressed to close the slot 18, the sleeve will have a close sliding fit within the passage 14 in support body 12. The outside diameter of the ring 32 is slightly less than the inside diameter of the guide sleeve 16 when it is mounted in the passage 14. The ring assembly 30 is inserted into the guide sleeve illustrated in FIG. 3 by slipping the assembly over the end of a suitable tool, now shown, which supports the ring in a plane normal to the longitudinal axis of the guide sleeve and allows the ring to be pushed into the sleeve from one end thereof. By the use of such a tool, the ring assembly is inserted into the open guide sleeve 16 until the tabs 34 are aligned with the openings 40. The sleeve 16 is then squeezed down around the ring whereby the tabs extend into the openings 40. The openings are longer in the circumferential direction than are the tabs 34 to allow the collapsing of the sleeve around the ring. The guide sleeve with the ring fixedly mounted therein is then pushed into the passage 14 to provide the assembly illustrated in FIG. 1.

The guide sleeve 16 and tabs 34 on the ring 32 provide a support for holding the ring in the passage 14 in a plane which is normal to the longitudinal axis of the passage so that the film 36 may be engaged flush by the end faces of the mating ferrules 18 inserted into the opposite ends of the guide sleeve. It will be appreciated that tabs 34 and cooperating holes 40 in the guide sleeve also hold the ring assembly in a predetermined position longitudinally within the passage 14 so that the film 36 may be properly positioned for abuttment by the ferrules 18 when the mating halves (not shown) of the connector 10 are interengaged. It will be noted that the guide sleeve 16 and thus the ring assembly 30 may be removed from the support body 12 in order to allow replacement of the ring assembly or of the film 36 on the original assembly.

As seen in FIG. 1, the outside diameter of the forward extension 22 of each ferrule 18 is less than the inside diameter of the ring 32 to allow the mating end faces of the ferrules to engage the film 36 when the ferrules are mounted in abutting relationship in the guide sleeve.

Figure 4:
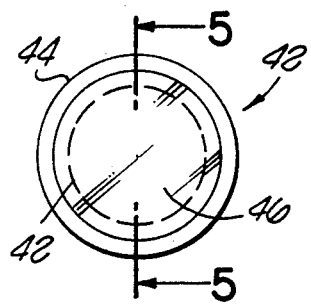
FIG. 4 is an elevational view of an alternative form of the ring which may be utilized in the connector of the present invention.
Figure 5:
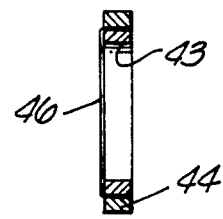
FIG. 5 is a sectional view taken along line 5—5 of FIG. 4.
Figure 6:
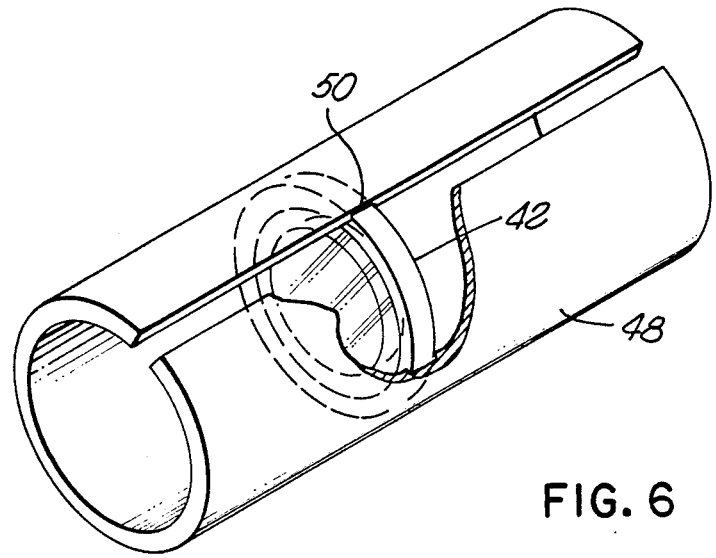
FIG. 6 is a perspective view of an alternative form of the guide sleeve of the present invention in which the ring of FIGS. 4 and 5 is mounted.

Reference is now made to FIGS. 4 to 6 which illustrate a modified embodiment of the ring assembly and guide sleeve which may be utilized in the connector illustrated in FIG. 1. In FIGS. 4 and 5, there is shown a ring assembly 42 comprising an inner ring 43 and an outer ring 44. A film 46 is initially stretched over the inner ring and the outer ring is then pressed over the inner ring to frictionally hold the outer periphery of the film therebetween. The guide sleeve 48 illustrated in FIG. 6 is similar to the sleeve 16 except that an interior annular groove 50 is provided in the sleeve rather than a plurality of openings. When the longitudinally slit sleeve 48 is collapsed around the ring assembly 42, the outer ring 44 is positioned firmly in the groove 50 to properly support and position the ring assembly in the guide sleeve.

Figure 7:
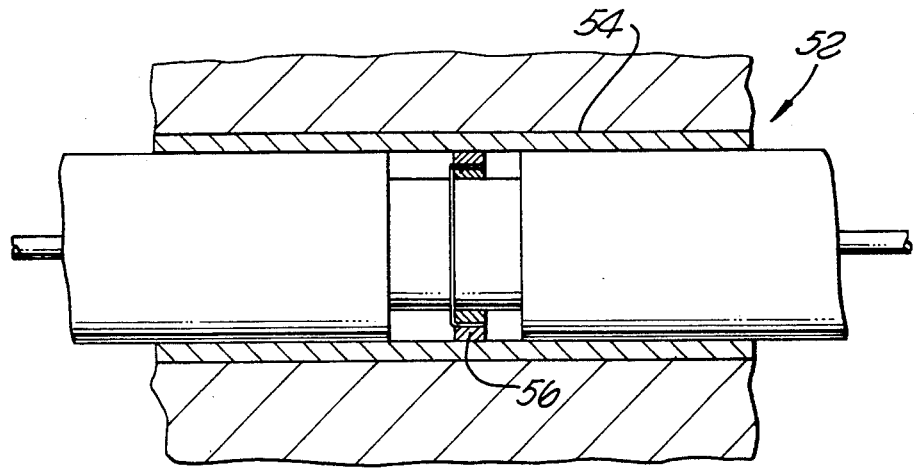
FIG. 7 is a fragmentary longitudinal sectional view through a further form of the connector of the present invention.

Referring now to FIG. 7 of the drawings, there is shown still a further embodiment of the connector of the present invention, generally designated 52. This embodiment is similar to that illustrated in FIG. 1 except that the guide sleeve 54 is not longitudinally slit, but rather has a circumferentially continuous wall. In this instance, the ring assembly 56 is similar to the ring assembly 42 but it is dimensioned to have an interference fit within the sleeve 54. The ring assembly 56 may be pushed into the sleeve 54 by the use of a suitable tool to cause it to become press-fit therein in a predetermined position longitudinally within the sleeve.

A 0.0006 inch thick Mylar film has been disposed between mating jeweled ferrules as disclosed herein to determine the extent of light transmission losses due to Fresnel losses and spacing of the end faces of the ferrules. Even though Mylar plastic has an index of refraction which is not as closely matched to that of the optical fibers as are prior art index matching materials which have been utilized in optical fiber connectors, it has been found that light transmission losses utilizing such a film are reduced to about 2.020 dB, as compared to a loss of 2.316 dB when the film is not disposed between the ferrules. Thus, it will be appreciated that by the use of the thin solid film of the present invention, Fresnel losses are substantially reduced, and losses due to the space between the end faces of the ferrules are minimized, even though the Mylar film does not have an index of refraction closely matching that of the fibers in the ferrules.

What is claimed is:

1. A fiber optic connector comprising:
   a support body having a passage therethrough;
   a pair of fiber optic ferrules each having an optical fiber therein;
   a ring;
   a film extending across said ring and being secured thereto;
   said film having an index of refraction similar to, but not necessarily matching, that of the fibers;
   means supporting said ring in said passage in a plane extending normal to the longitudinal axis of said passage; and
   said ferrules being mounted in the opposite ends of said passage each abutting against said film.

2. A fiber optic connector as set forth in claim 1 wherein:
   said supporting means holds said ring in a predetermined position longitudinally within said passage.

3. A fiber optic connector as set forth in claim 1 wherein:
   said supporting means removable retains said ring in said passage.

4. A fiber optic connector as set forth in claim 1 wherein:
   said supporting means comprises a guide sleeve mounted in said passage; and
   said ring is mounted in said guide sleeve.

5. A fiber optic connector as set forth in claim 4 wherein:
   said guide sleeve is longitudinally slit and embodies at least three openings in the wall thereof lying in said plane; and
   said ring embodies outwardly extending tabs positioned in said openings.

6. A fiber optic connector as set forth in claim 1 wherein:
   said film extends across one face of said ring.

7. A fiber optic connector as set forth in claim 6 wherein:
   said ring comprises inner and outer annular parts; and
   the periphery of said film is frictionally retained between said parts.

8. A fiber optic connector as set forth in claim 6 wherein:

said film is heat shrunk about the outer periphery of said ring.

9. A fiber optic connector as set forth in claim 4 wherein:
said guide sleeve is longitudinally slit and embodies an interior annular groove lying in said plane; and
said ring is mounted in said groove.

10. A fiber optic connector as set forth in claim 4 wherein:
said guide sleeve is circumferentially continuous; and
said ring is frictionally fitted into said sleeve.

11. A fiber optic connector as set forth in claim 1 wherein:
the thickness of said film is on the order of 0.0006 inch.

12. A fiber optic connector as set forth in claim 1 wherein:
at least one of said ferrules comprises a cylindrical body having a forward cylindrical extension of a diameter less than that of said body, the diameter of said extension being less than the inner diameter of said ring whereby said extension may slide into said ring.

* * * * *